(12) United States Patent
Ashok et al.

(10) Patent No.: US 9,716,640 B2
(45) Date of Patent: *Jul. 25, 2017

(54) MANAGING ISOLATION REQUIREMENTS OF A MULTI-NODE WORKLOAD APPLICATION

(71) Applicant: International Business Machines Corporation, Armonk, NY (US)

(72) Inventors: Rohith K. Ashok, Natick, MA (US); Erik J. Burckart, Raleigh, NC (US); Aaron J. Quirk, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 221 days.

This patent is subject to a terminal disclaimer.

(21) Appl. No.: 14/524,740

(22) Filed: Oct. 27, 2014

(65) Prior Publication Data

US 2015/0304232 A1  Oct. 22, 2015

Related U.S. Application Data

(63) Continuation of application No. 14/256,110, filed on Apr. 18, 2014.

(51) Int. Cl.
| | |
|---|---|
| *G06F 15/173* | (2006.01) |
| *H04L 12/26* | (2006.01) |
| *H04L 12/927* | (2013.01) |
| *H04L 12/851* | (2013.01) |

(Continued)

(52) U.S. Cl.
CPC ...... *H04L 43/0817* (2013.01); *H04L 41/5025* (2013.01); *H04L 41/5035* (2013.01); *H04L 47/2425* (2013.01); *H04L 47/72* (2013.01); *H04L 47/805* (2013.01); *H04L 41/5096* (2013.01)

(58) Field of Classification Search
CPC .. H04L 47/72; H04L 47/2445; H04L 43/0817
See application file for complete search history.

(56) References Cited

U.S. PATENT DOCUMENTS

| | | |
|---|---|---|
| 7,941,804 B1 | 5/2011 | Herington et al. |
| 2003/0139917 A1* | 7/2003 | Hardwick ........... G06F 11/3414 703/21 |
| 2006/0004944 A1 | 1/2006 | Vij et al. |

(Continued)

OTHER PUBLICATIONS

U.S. Appl. No. 14/256,110, filed Apr. 18, 2014.

*Primary Examiner* — Yves Dalencourt
(74) *Attorney, Agent, or Firm* — Bryan D. Wells; Maeve M. Carpenter

(57) ABSTRACT

In an approach to manage isolation requirements of a multi-node workload application, a computer determines one or more first isolation levels for each of a plurality of workload nodes. The computer receives performance data for the plurality of workload nodes and analyzes the performance data for statistical trends in the performance data. The computer identifies an adverse trend in the statistical trends of the performance data and identifies a root cause of the adverse trend in the performance data. The computer then identifies one or more second isolation levels required to meet performance targets, the second isolation levels including an adjustment to the first isolation levels for the plurality of workload nodes.

9 Claims, 4 Drawing Sheets

(51) Int. Cl.
*H04L 12/911* (2013.01)
*H04L 12/24* (2006.01)

(56) References Cited

U.S. PATENT DOCUMENTS

| | | | |
|---|---|---|---|
| 2006/0090163 A1* | 4/2006 | Karlsson | G06F 11/3409 |
| | | | 718/105 |
| 2006/0242229 A1 | 10/2006 | Kinsey et al. | |
| 2010/0174811 A1 | 7/2010 | Musiri et al. | |
| 2012/0185735 A1* | 7/2012 | Sambamurthy | G06F 11/079 |
| | | | 714/47.1 |
| 2013/0003538 A1 | 1/2013 | Greenberg et al. | |

* cited by examiner

MANAGING ISOLATION REQUIREMENTS OF A MULTI-NODE WORKLOAD APPLICATION

FIELD OF THE INVENTION

The present invention relates generally to the field of computer network management, and more particularly to managing isolation requirements of a multi-node workload application.

BACKGROUND OF THE INVENTION

Public and private cloud technologies provide the opportunity for many types of runtime environments. Some environments have a high degree of runtime isolation, and others a lesser degree of isolation. Runtime isolation allows an individual application to be stopped, started, or updated without impacting, or being impacted by, other resources deployed within the environment. Each environment has advantages, for example, a highly isolated environment can have faster peak performance and reduced impact from other workloads on the cloud. However, this advantage comes at the cost of less overall cloud capacity and thus the operating cost of the cloud increases.

Service level agreements ("SLA") include requirements that dictate the isolation levels of a workload at deployment time. Workloads are collections of various pieces of middleware to support the intended functions of an application. For example, a web workload can be made up of distinct systems to provide Hypertext Transfer Protocol ("HTTP"), database, application server, analytics, etc. While the middleware roles as a whole come together to enable the desired workload function, they each have individual performance characteristics and resource requirements. For example, a database may have a higher dependency on disk performance, while an HTTP server may have a higher dependency on central processing unit ("CPU") performance. In a cloud environment, physical resource sharing and over commitment can have various degrees of impact on individual workloads, and result in impacts to the ability to maintain end-to-end SLA requirements.

SUMMARY

Embodiments of the present invention disclose a method, computer system, and computer program product for managing isolation requirements of a multi-node workload application. An embodiment includes a computer determining one or more first isolation levels for each of a plurality of workload nodes. The computer receives performance data for the plurality of workload nodes and analyzes the performance data for statistical trends in the performance data. The computer identifies an adverse trend in the statistical trends of the performance data and identifies a root cause of the adverse trend in the performance data. The computer then identifies one or more second isolation levels required to meet performance targets, the second isolation levels including an adjustment to the first isolation levels for the plurality of workload nodes.

DETAILED DESCRIPTION

In order for a system to respond to SLA requirements in a cloud computing environment, the needs of each individual workload must be understood and managed individually. A primary way to impact a workload's performance is to manage the degree to which the cloud environment's resources are shared or isolated. Embodiments of the present invention recognize a need to manage the degree to which specific workloads may be consolidated and share resources, while still maintaining end-to-end SLA requirements. Implementation of embodiments of the invention may take a variety of forms, and exemplary implementation details are discussed subsequently with reference to the Figures.

Figure 1:
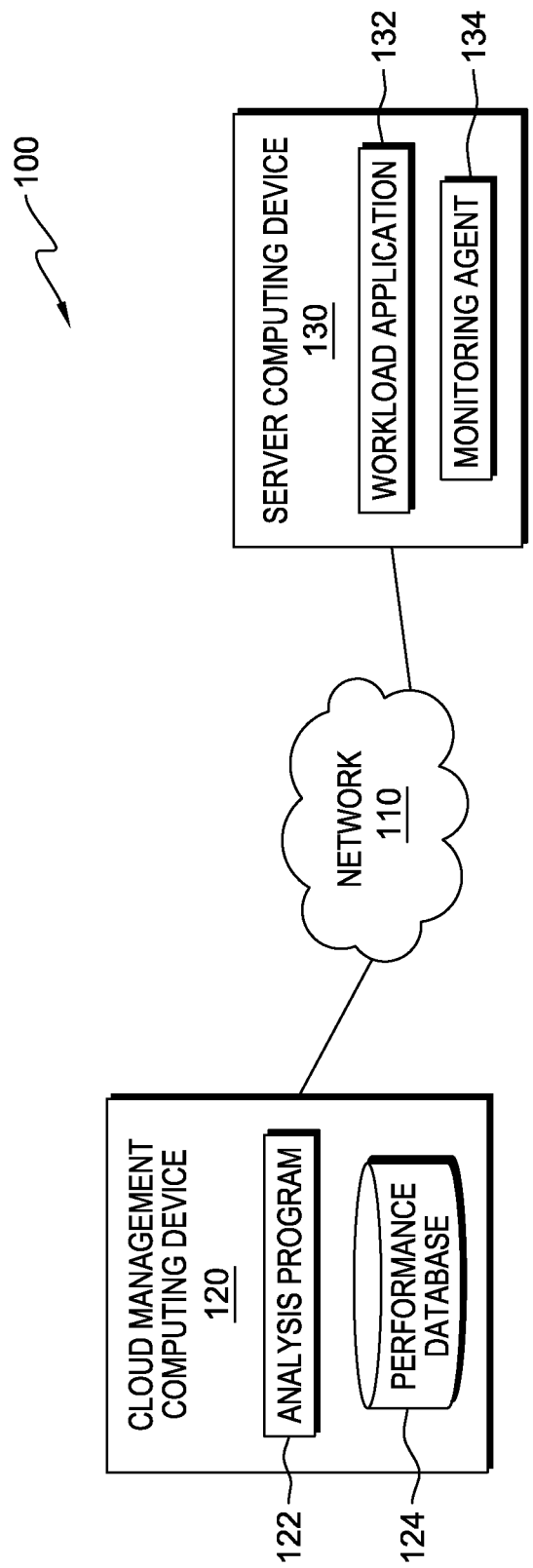
FIG. 1 is a functional block diagram illustrating a data processing environment, in accordance with an embodiment of the present invention.

FIG. 1 is a functional block diagram illustrating a data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Data processing environment 100 includes cloud management computing device 120 and server computing device 130, all interconnected via network 110. Network 110 can be, for example, a local area network (LAN), a wide area network (WAN), such as the Internet, a virtual local area network (VLAN), or a combination of the three, and can include wired, wireless, or fiber optic connections. In general, network 110 can be any combination of connections and protocols that will support communications between cloud management computing device 120, server computing device 130, and other components and devices within data processing environment 100.

An embodiment of the present invention includes a cloud computing implementation, however implementation of the teachings recited herein are not limited to a cloud computing environment. Rather, embodiments of the present invention are capable of being implemented in conjunction with any other type of computing environment known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Cloud management computing device 120 and server computing device 130 can each be a cloud computing node operational within data processing environment 100 or each may represent a server computing system utilizing multiple computers as a server system, such as in a cloud computing environment. Each of cloud management computing device 120 and server computing device 130 may be a management server, a web server, or any other electronic device, computing system, or combination of programmable electronic devices or computing systems capable of receiving and sending data and on which cloud management software may operate. In other embodiments, each of cloud management computing device 120 and server computing device 130 may be a laptop computer, a tablet computer, a netbook computer, a personal computer, a desktop computer, a personal digital assistant (PDA), a smart phone, or any programmable electronic device capable of executing machine readable program instructions and of communicating with other computing devices within data processing environment 100 via network 110. In another embodiment, each of cloud management computing device 120 and server computing device 130 can represent a computing system utilizing clustered computers and components to act as a single pool of seamless resources.

Cloud management computing device 120 can be a cloud based network controller for providing managing, monitoring, and controlling of various functions and operations within a cloud environment. Cloud management computing device 120 includes analysis program 122 and performance database 124. Upon deployment of a multi-node workload application which requires the use of multiple computing devices and shared resources, analysis program 122 determines isolation requirements for each individual workload node with respect to a pre-defined workload application Service Level Agreement ("SLA"). A pre-defined SLA is determined by a user or cloud controller prior to deployment of the multi-node workload application. Analysis program 122 receives runtime performance data, for example, performance metrics for network utilization, memory, or disk usage, for each computing node, monitors the workload performance at each node, and determines whether one or more of the monitored performance data characteristics exhibits an adverse trend over time, indicating a regression in the overall SLA requirements. If any performance metrics of the performance data characteristics exhibit an adverse trend, analysis program 122 determines a root cause of the adverse trend and identifies isolation levels required to meet targets corresponding to the SLA. For example, in order to meet SLA target requirements, analysis program 122 may identify increasing isolation requirements for the workload node associated with the identified performance metric. Performance database 124 stores the performance data received for each workload node. Internal and external hardware components of cloud management computing device 120 are depicted and described with reference to FIG. 4.

Server computing device 130 includes workload application 132 and monitoring agent 134. Workload application 132 is an individual workload node of a multi-node workload application deployed to a computing node within data processing environment 100, for example, server computing device 130. Monitoring agent 134 operates on a computing node, such as server computing device 130, and measures performance characteristics of the individual workload over time and transmits the performance characteristics to a cloud controller, for example, cloud management computing device 120 or a cloud management software operating on cloud management computing device 120. While shown in FIG. 1 as a single server device, in various embodiments, server computing device 130 may represent multiple server computing devices within data processing environment 100, each including respective versions of workload application 132 and monitoring agent 134.

Figure 2:
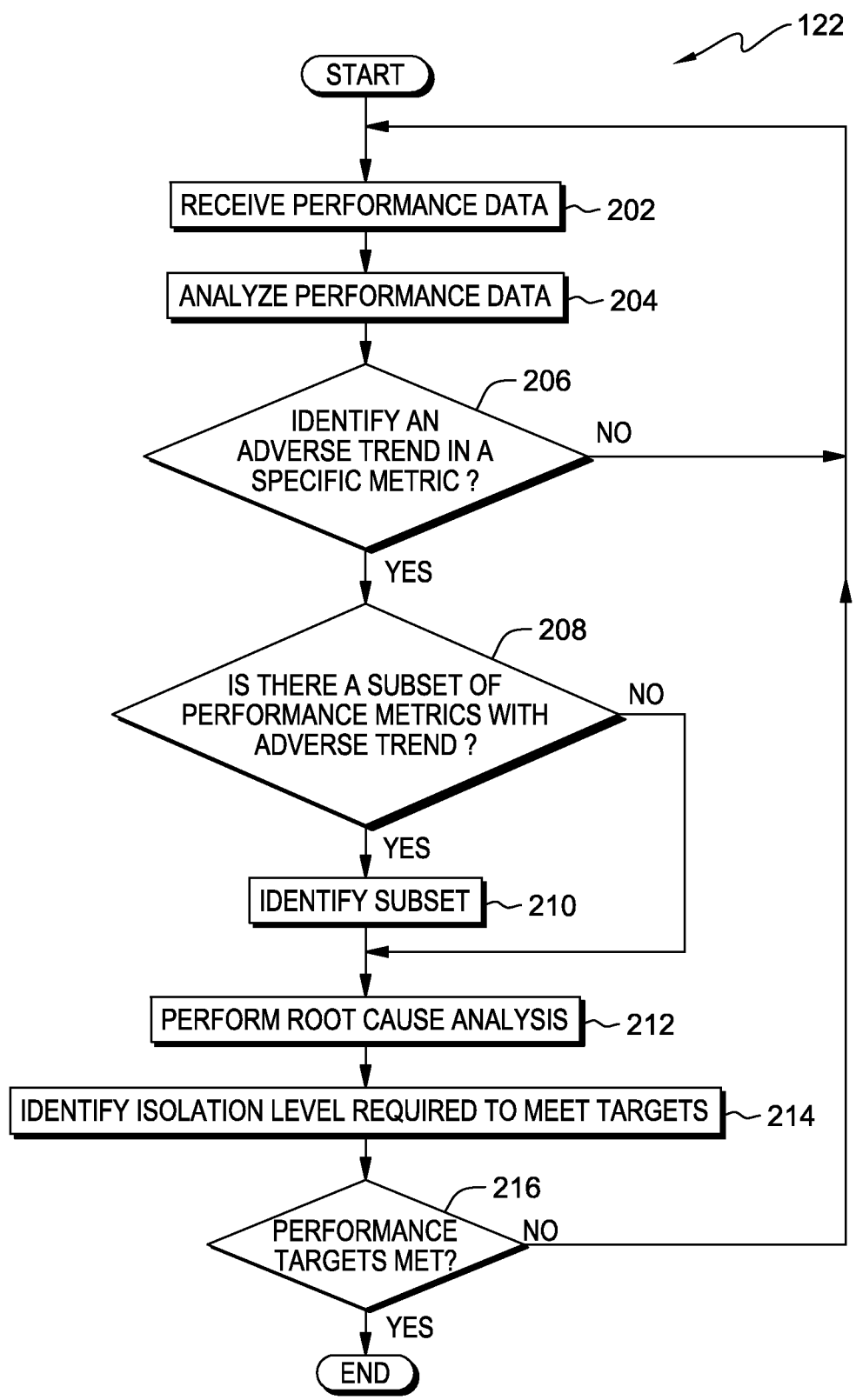
FIG. 2 is a flowchart depicting operational steps of an analysis program, for monitoring and analyzing performance data of multi-node workload applications in the data processing environment of FIG. 1, in accordance with an embodiment of the present invention.

FIG. 2 is a flowchart depicting operational steps of analysis program 122, for monitoring and analyzing performance data of multi-node workload applications in data processing environment 100, in accordance with an embodiment of the present invention.

Analysis program 122 receives performance data (step 202). Performance data, specifically performance characteristics, are received from each workload node within data processing environment 100, for example, from monitoring agent 134 operating on server computing device 130, and measure the performance of individual workloads deployed to the computing nodes for a multi-node workload application per a pre-defined SLA. Performance characteristics that are monitored include operating system (OS), CPU, memory, disk, network utilization rates, and application level metrics, for example, request response time and throughput, including minimum and maximum values for each performance characteristic. Performance data is collected and stored in performance database 124.

Analysis program 122 analyzes the performance data (step 204). Performance data is collected over time, and includes performance characteristics of each workload node and a set of performance metric values describing each performance characteristic. The performance data is stored in performance database 124 along with the isolation level of each workload node. For example, if an application workload performance is not dependent on network performance, the workload node may be deployed to a computing node with a low isolation level for network connections, the low isolation level indicating the network is heavily shared for the computing node. Performance data for the workload node is stored associated with information on the low isolation level. Analysis program 122 analyzes the performance data by comparing a workload node performance against pre-defined SLA targets and measuring statistical trends in the performance data.

Analysis program 122 identifies whether an adverse trend is occurring in a specific performance metric data (decision block 206). Analysis program 122 identifies whether workload performance metrics in any of the performance characteristics vary from pre-defined SLA targets, which can indicate an adverse trend in the performance data statistical trends. If no adverse trend is identified (decision block 206, "no" branch), analysis program 122 returns to receive and analyze performance data. If an adverse trend is occurring in the data (decision block 206, "yes" branch), then analysis program 122 determines whether a subset of performance metrics across all computing nodes also exhibit the adverse trend (decision block 208). Analysis program 122, responsive to determining a subset of performance metrics that is exhibiting an adverse trend over time, determines the relationship among the subset of performance metrics and the previously identified adverse trend in the overall performance data. The relationship determined is used to identify which performance metrics and workload node performance characteristics are impacted by the identified adverse trend and any performance metrics associated with the adverse trend. If a subset of performance metrics exhibits the adverse trend (decision block 208, "yes" branch), then analysis program 122 identifies the subset of performance metrics (step 210) and performs a root cause analysis on the subset of performance metrics (step 212). If a subset of performance metrics does not exhibit an adverse trend (decision block 208, "no" branch), then analysis program performs a root cause analysis on the performance data identified in step 206 (step 212).

Analysis program 122 performs a root cause analysis to determine a cause of the adverse trend in the performance data (step 212). The root cause analysis determines which performance metric is the cause of the adverse trend observation within the data, for example, a specific performance metric or workload node which began to fail first. In another example, a multi-VM workload consists of an application server and a database server and the SLA for the workload is application response time, which analysis program 122 identifies as starting to approach a threshold value. Analysis program 122 analyzes the performance data for both the application server and the database server when the program identifies the response time SLA beginning to slow down. Analysis program 122 determines the memory metrics on the database server begin to deteriorate at the same time as the response time SLA and can determine the database memory is the root cause of the SLA adverse trend. In an embodiment, the relationship of the subset of performance metrics and the adverse trend is used to determine which performance characteristics are impacted by the adverse trend, so analysis program 122 can determine and identify revised isolation levels for all impacted performance characteristics.

Analysis program 122 identifies isolation levels required to meet SLA targets, including any adjustments required for the workload nodes associated with the identified performance metric causing the adverse trend (step 214). Responsive to determining a root cause for the adverse trend, analysis program 122 identifies a revised isolation level that will improve the performance metrics identified in the root cause analysis, for example, an increase in one or more of the isolation requirements for the workload application nodes and resources. For example, if the performance data indicates a workload node requires an increased isolation level for network connections, e.g., the workload node performance depends on network performance, then analysis program 122 identifies an isolation level for the workload node with increased network connection isolation. Increasing isolation requirements can reduce contention on key resources such as CPU, memory, and network bandwidth, and allow the overall performance of the multi-node workload application to increase with respect to the pre-defined SLA targets. In an example, if the root cause analysis determined disk I/O latency caused a database server to slow down, then analysis program 122 can identify an isolation level for the workload with better disk I/O performance. In various embodiments of the present invention, one or more isolation level requirements may be decreased in order to allow additional isolation requirements to increase, for example, a workload node may require high isolation levels for network connections but low for database and disk resources. Analysis program 122 may decrease the workload node database and disk isolation in order to increase another workload node's database and disk isolation, within data processing environment 100.

In an embodiment, an operator of cloud management software on cloud management computing device 120 can choose an appropriate isolation level, for example, moving a workload node from a multi-tenant virtual machine to a dedicated hardware. In another embodiment, responsive to analysis program 122 identifying required isolation levels, analysis program 122 initiates and automates a transition among isolation levels. Analysis program 126 determines whether performance targets have been met by the multi-node workload application (decision block 216). If the performance targets have been met, for example, SLA requirements are complete (decision block 216, "yes" branch), then analysis program 122 ends processing. If the performance targets have not yet been met (decision block 216, "no" branch), then analysis program 122 returns to receive performance data and continues to monitor isolation levels in order to validate performance data after any adjustments to isolation levels have been made.

Figure 3:
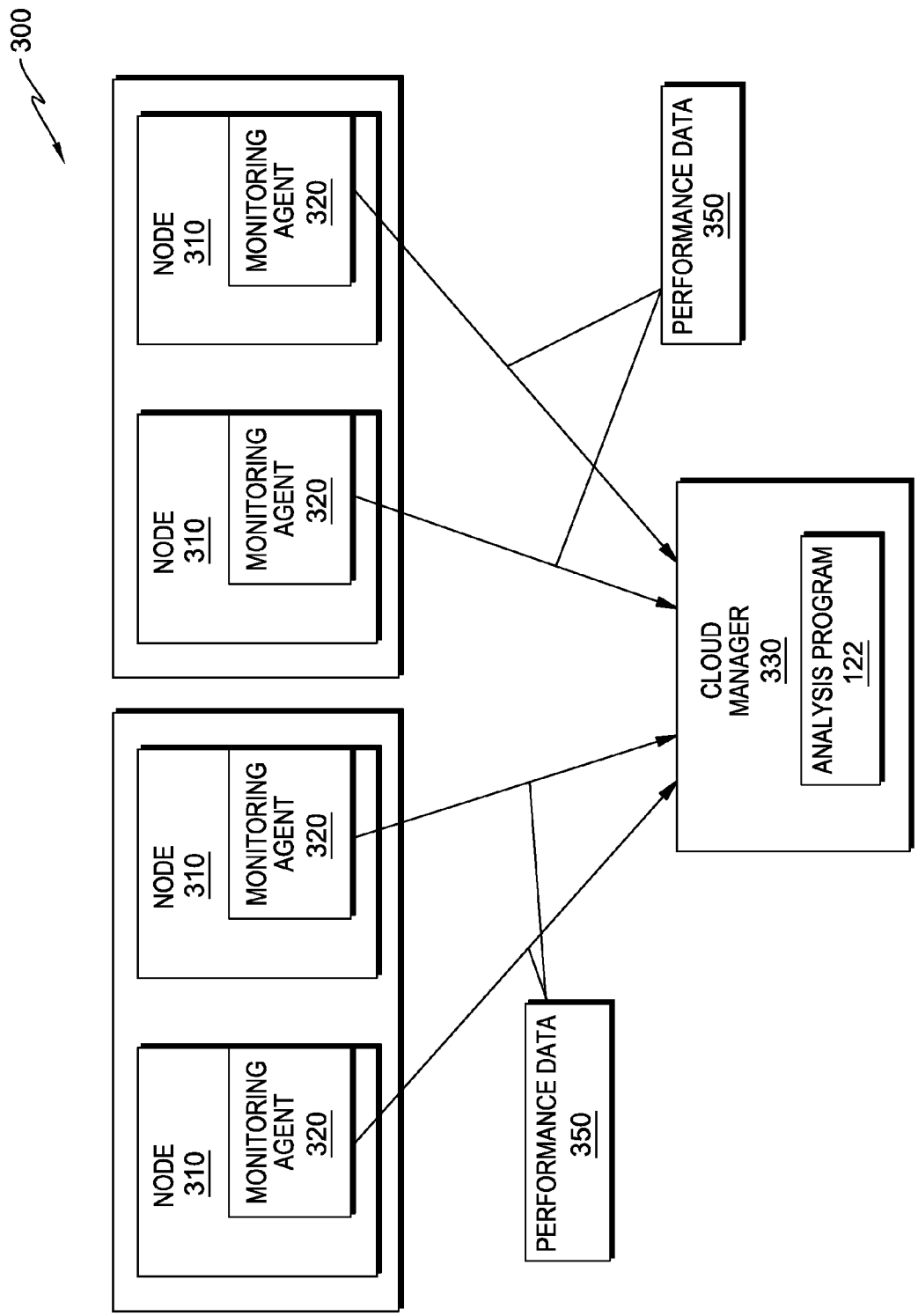
FIG. 3 depicts an exemplary flow diagram of data within the data processing environment of FIG. 1 for operation of the analysis program of FIG. 2, in accordance with an embodiment of the present invention.

FIG. 3 depicts an exemplary flow diagram of data within data processing environment 100 for operation of analysis program 122, in accordance with an embodiment of the present invention.

Diagram 300 includes several workload nodes 310, each including a monitoring agent 320. Each workload node 310 is an individual workload node of a multi-node workload application deployed to a computing node, based on pre-defined SLA requirements. Monitoring agent 320 monitors performance data characteristics of each workload node. In an embodiment, cloud manager 330 includes the capabilities of cloud management computing device 120, as discussed above with reference to FIG. 1, and includes analysis program 122. Analysis program 122 receives the performance data 350, and analyzes the performance data for each workload node over time in order to determine whether the performance data exhibits any adverse trends, as discussed with reference to FIG. 2.

Figure 4:
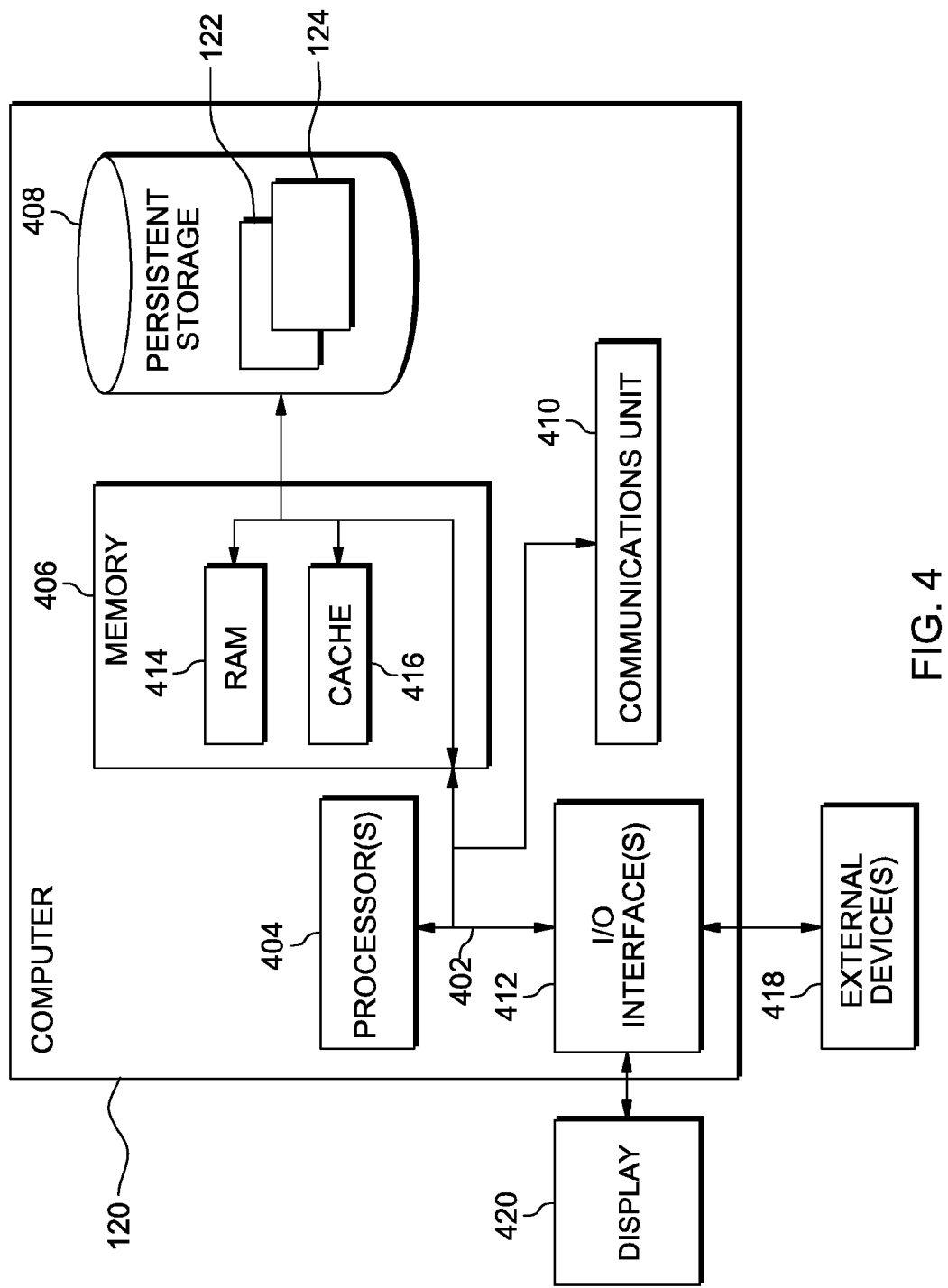
FIG. 4 depicts a block diagram of components of a computing system, such as the cloud management computing device of FIG. 1, in accordance with an embodiment of the present invention.

FIG. 4 depicts a block diagram of components of cloud management computing device 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Cloud management computing device 120 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer-readable storage media.

Analysis program 122 and performance database 124 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information thereon.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including server computing device 130. In these examples, communications unit 410 includes one or more network interface cards. Communications unit 410 may provide communications through the use of either or both physical and wireless communications links. Analysis program 122 and performance database 124 may be downloaded to persistent storage 408 through communications unit 410.

I/O interface(s) 412 allows for input and output of data with other devices that may be connected to cloud management computing device 120. For example, I/O interface(s) 412 may provide a connection to external device(s) 418 such as a keyboard, a keypad, a touch screen, and/or some other suitable input device. External device(s) 418 can also include portable computer-readable storage media such as, for example, thumb drives, portable optical or magnetic disks, and memory cards. Software and data used to practice embodiments of the present invention, e.g., analysis program 122 and performance database 124, can be stored on such portable computer-readable storage media and can be loaded onto persistent storage 408 via I/O interface(s) 412. I/O interface(s) 412 also connect to a display 420. Display 420 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing isolation requirements of a multi-node workload application, the method comprising:
   determining, by one or more computer processors, one or more first isolation levels for each of a plurality of workload nodes;
   receiving, by one or more computer processors, performance data for the plurality of workload nodes;
   analyzing, by one or more computer processors, the performance data for statistical trends in the performance data;
   identifying, by one or more computer processors, an adverse trend in the statistical trends of the performance data, wherein the performance data represents a plurality of performance metrics and the adverse trend is in a first performance metric of the plurality of performance metrics that describes a first performance characteristic of the plurality of workload nodes;
   analyzing, by one or more computer processors, a second performance metric of the plurality of performance metrics, wherein the second performance metric describes a second performance characteristic of the plurality of workload nodes;
   determining, by one or more computer processors, that the second performance metric began to deteriorate contemporaneously with the adverse trend in the first performance metric, and in response, determining, by one or more computer processors, that the deterioration of the second performance metric is a root cause of the adverse trend in the performance data; and
   identifying, by one or more computer processors, one or more second isolation levels required to meet performance targets, the second isolation levels including an adjustment to the first isolation levels for the plurality of workload nodes.

2. The method of claim 1, wherein the identifying an adverse trend in the statistical trends of the performance data further comprises:
   determining, by one or more computer processors, one or more performance targets for the plurality of workload nodes; and
   comparing, by one or more computer processors, the one or more performance targets for the plurality of workload nodes to the statistical trends of the performance data.

3. The method of claim 2, wherein the determining, by one or more computer processors, one or more performance targets for the plurality of workload nodes further comprises receiving, by one or more computer processors, the one or more performance targets for the plurality of workloads from a workload application service level agreement.

4. The method of claim 1, further comprising, responsive to identifying one or more second isolation levels required to meet performance targets, automating, by one or more computer processors, a transition among isolation levels from the one or more first isolation levels to the one or more second isolation levels.

5. The method of claim 1, wherein the identifying, by one or more computer processors, one or more second isolation levels includes increasing isolation requirements for at least one of the one or more second isolation levels from the one or more first isolation levels.

6. The method of claim 1, wherein the identifying, by one or more computer processors, one or more second isolation levels includes decreasing isolation requirements for at least one of the one or more second isolation levels from the one or more first isolation levels.

7. The method of claim 1, wherein the:
   analyzing, by one or more computer processors, a second performance metric of the plurality of performance metrics, further comprises:
      identifying, by one or more computer processors, a first subset of the performance data corresponding to a first computing resource;
      identifying, by one or more computer processors, a second subset of the performance data corresponding to a second computing resource; and
      analyzing, by one or more computer processors, data representing the second performance metric in the first subset of the performance data and data representing the second performance metric in the second subset of the performance data; and
   determining, by one or more computer processors, that the second performance metric began to deteriorate contemporaneously with the adverse trend in the first performance metric and in response, determining, by one or more computer processors, that the deterioration of the second performance metric is a root cause of the adverse trend in the performance data further comprises:
      determining, by one or more computer processors, that the second performance metric of the first computing resource began to deteriorate contemporaneously with the adverse trend in the first performance metric;
      determining, by one or more computer processors, that the second performance metric of the second computing resource did not deteriorate contemporaneously with the adverse trend in the first performance metric; and determining, by one or more computer processors, that the second performance metric of the first computing resource is the root cause of the adverse trend in the performance data.

8. The method of claim 7, wherein:

the first performance characteristic is application response time;

the first performance metric is a performance metric relating to application response time;

the second performance characteristic relates to computer memory;

the second performance metric is a performance metric relating to computer memory;

the first computing resource is an application server; and the second computing resource is a database server.

9. The method of claim 1, wherein:

the first performance characteristic is application response time;

the first performance metric is a performance metric relating to application response time;

the second performance characteristic relates to computer memory; and the second performance metric is a performance metric relating to computer memory.

* * * * *